United States Patent [19]

Malaviya

[11] 3,814,953

[45] June 4, 1974

[54] MASTER-SLAVE BINARY DIVIDER CIRCUIT

[75] Inventor: Shashi D. Malaviya, Fishkill, N.Y.

[73] Assignee: International Business Machines Corporation, Armonk, N.Y.

[22] Filed: Dec. 29, 1972

[21] Appl. No.: 319,121

[52] U.S. Cl. ............. 307/289, 307/225 R, 307/291, 328/206

[51] Int. Cl. ........................ H03k 3/12, H03k 3/286

[58] Field of Search ............ 307/238, 247 R, 225 R, 307/279, 289, 291, 292; 328/195, 200, 206

[56] References Cited

UNITED STATES PATENTS

| | | | |
|---|---|---|---|
| 3,437,840 | 4/1969 | Murray et al. | 307/291 X |
| 3,440,449 | 4/1969 | Priel et al. | 307/291 |
| 3,585,410 | 6/1971 | Burtness | 307/291 |
| 3,603,819 | 9/1971 | Molle | 307/291 |
| 3,617,776 | 11/1971 | Priel | 307/289 X |
| 3,621,289 | 11/1971 | Sasaki | 307/291 X |
| 3,622,810 | 11/1971 | Sasaki | 307/291 |
| 3,703,711 | 11/1972 | Duben | 307/292 X |

*Primary Examiner*—Rudolph V. Rolinec
*Assistant Examiner*—L. N. Anagnos
*Attorney, Agent, or Firm*—Martin G. Reiffin; Thomas F. Galvin

[57] ABSTRACT

A binary divider circuit of the master-slave type. The master bistable flip-flop and the slave bistable flip-flop are arranged in series between the voltage supply lines so that current flows from one of the supply lines through one of the bistable circuits and then through the other of the bistable circuits into the other supply line. The series arrangement of the bistable circuits provides reduced power dissipation and increased switching speed. The disclosed embodiment further comprises diodes extending from one voltage supply line to the master bistable circuit for bypassing current around the slave bistable circuit and to the master bistable circuit so as to provide higher output power and/or faster switching speed for the master bistable circuit. The diodes further function as a voltage regulator for maintaining the voltage across each bistable circuit approximately constant to prevent the bistable circuits from interacting with each other as their respective impedances vary during switching operations.

13 Claims, 3 Drawing Figures

MASTER-SLAVE BINARY DIVIDER CIRCUIT

BACKGROUND OF THE INVENTION

1. Field of the Invention

This invention relates to binary divider circuits for use in digital computers and other data processing systems, and more particularly, to binary dividers of the master-slave type.

2. Description of the Prior Art

Binary divider circuits of the master-slave type are well known and have been extensively used in the prior art. For example, the binary divider circuits of the master-slave type are shown in the following patents:

| INVENTOR | U.S. PAT. No. | DATE |
|---|---|---|
| Murray et al. | 3,437,840 | Apr. 8, 1969 |
| Priel et al. | 3,440,449 | Apr. 22, 1969 |
| Sasaki | 3,621,289 | Nov. 16, 1971 |
| Sasaki | 3,622,810 | Nov. 23, 1971 |

This type of binary divider comprises a pair of bistable circuits or flip-flops, one of which is designated as the "master" and the other of which is designated as the "slave." The two bistable circuits are interconnected so that the state of each circuit may be changed in accordance with the state of the other circuit.

Binary divider circuits are of extreme importance in digital computers and other data processing systems because they are essential to arithmetic computations, logic operations, and the timing and control functions of the system. The master-slave type of binary divider circuit is superior to other types of binary divider circuits with respect to several aspects of operation and performance and is generally preferred wherever it may be utilized. Furthermore, it is usually necessary to use the master-slave type wherever the width of the input pulse signal can vary over a wide range, as is generally the case in counters.

However, the master-slave type of binary divider circuit of the prior art suffers from a serious disadvantage which frequently precludes its use in a particular application. More specifically, in the prior art the master and slave bistable circuits have been arranged in parallel between the two power supply lines, usually a positive voltage line and a ground line. As a result of this parallel arrangement, the total current drawn by the binary divider circuit is equal to the sum of the currents in the master and slave flip-flops. This produces a relatively large power dissipation which in many instances is excessive for the particular application so as to compel abandonment of the master-slave type of binary divider and resort to a different type of binary divider having less advantageous performance and operating characteristics.

SUMMARY OF THE INVENTION

It is therefore a primary object of the present invention to provide a novel binary divider circuit with the advantages of the prior art master-slave type but without the disadvantages thereof. More specifically, the binary divider circuit in accordance with the present invention comprises a master bistable circuit and a slave bistable circuit which are interconnected in a novel manner so as to provide substantially reduced power dissipation.

This object is ahieved by arranging the master and slave bistable circuits in series between the two power supply lines, rather than in parallel as in the prior art. As a result, the current flowing through the slave bistable circuit also flows through the master bistable circuit so that the total current drawn by the entire divider circuit is substantially reduced and the power dissipation is reduced accordingly.

Another novel feature of the present invention resides in the provision of conductive means extending from one supply line to the master bistable circuit for bypassing current around the slave bistable circuit, whereby the master bistable circuit has a larger current and thereby provides a higher output power and/or a faster switching speed than the slave bistable circuit. In the preferred embodiment disclosed, the conductive means is in the form of a series-connected pair of diodes.

This arrangement provides a further advantage in that the diodes function as a voltage regulator for maintaining the voltage across the bistable circuit approximately constant to prevent each bistable circuit from interacting with the other bistable circuit as their respective impedances vary during switching operations.

Other objects and advantages of the present invention are inherent in the structure and mode of operation disclosed and/or will be apparent to those skilled in the art as the detailed description proceeds.

DETAILED DESCRIPTION OF THE PRIOR ART

Figure 1:
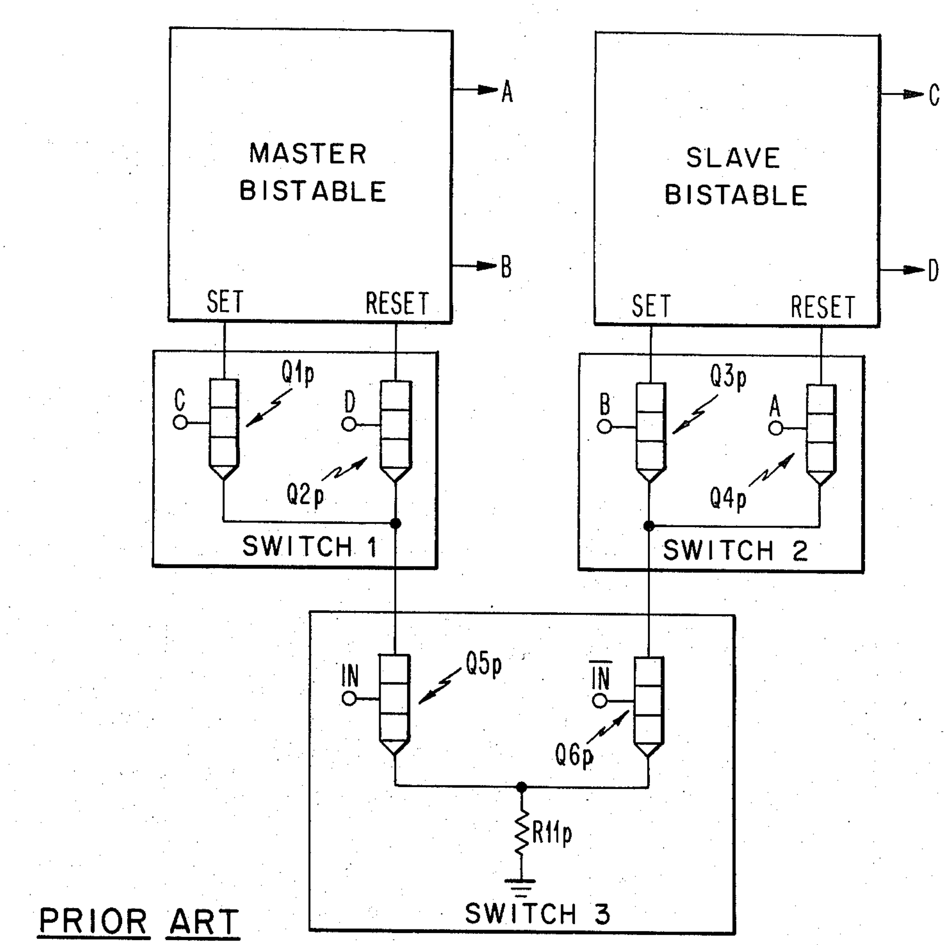
FIG. 1 is a schematic diagram illustrating the mode of operation of a master-slave binary divider circuit.

Referring first to FIG. 1, there is disclosed the basic circuit configuration of the master-slave binary divider in accordance with the prior art, and its mode of operation will now be briefly described. When input IN is up and input $\overline{IN}$ is down, transistor Q5*p* conducts and transistor Q6*p* is cut off, since these transistors have their emitters connected to a common resistor R11*p* and operate as a current switch. Assuming that the slave bistable circuit is set, its output C is up thereby forward biasing the base-emmiter junction of transistor Q1*p* so that the collector current of transistor Q5*p* flows through transistor Q1*p*, thereby setting the master bistable circuit so that its output A goes up and its output B goes down. When input IN goes down, and input $\overline{IN}$ comes up, transistor Q5*p* is cut off and transistor Q6*p* turns on. The collector current of transistor Q6*p* flows through transistor Q4*p* so as to reset the slave bistable circuit and the output C of the latter goes down and its output D goes up.

When the next cycle starts, input IN goes up and input $\overline{IN}$ goes down so that the transistor Q5*p* conducts again. However, this time its collector current goes through transistor Q2*p* to reset the master bistable circuit and the output A of the latter goes down and its output B goes up. Input IN then goes down and input $\overline{IN}$ goes up so that the transistor Q6*p* conducts and its collector current now goes through transistor Q3p to set the slave bistable circuit, thereby completing the cycle of operation. The output of the binary divider may be taken either from outputs A and B of the master bistable circuit or outputs C and D of the slave bistable circuit.

Figure 2:
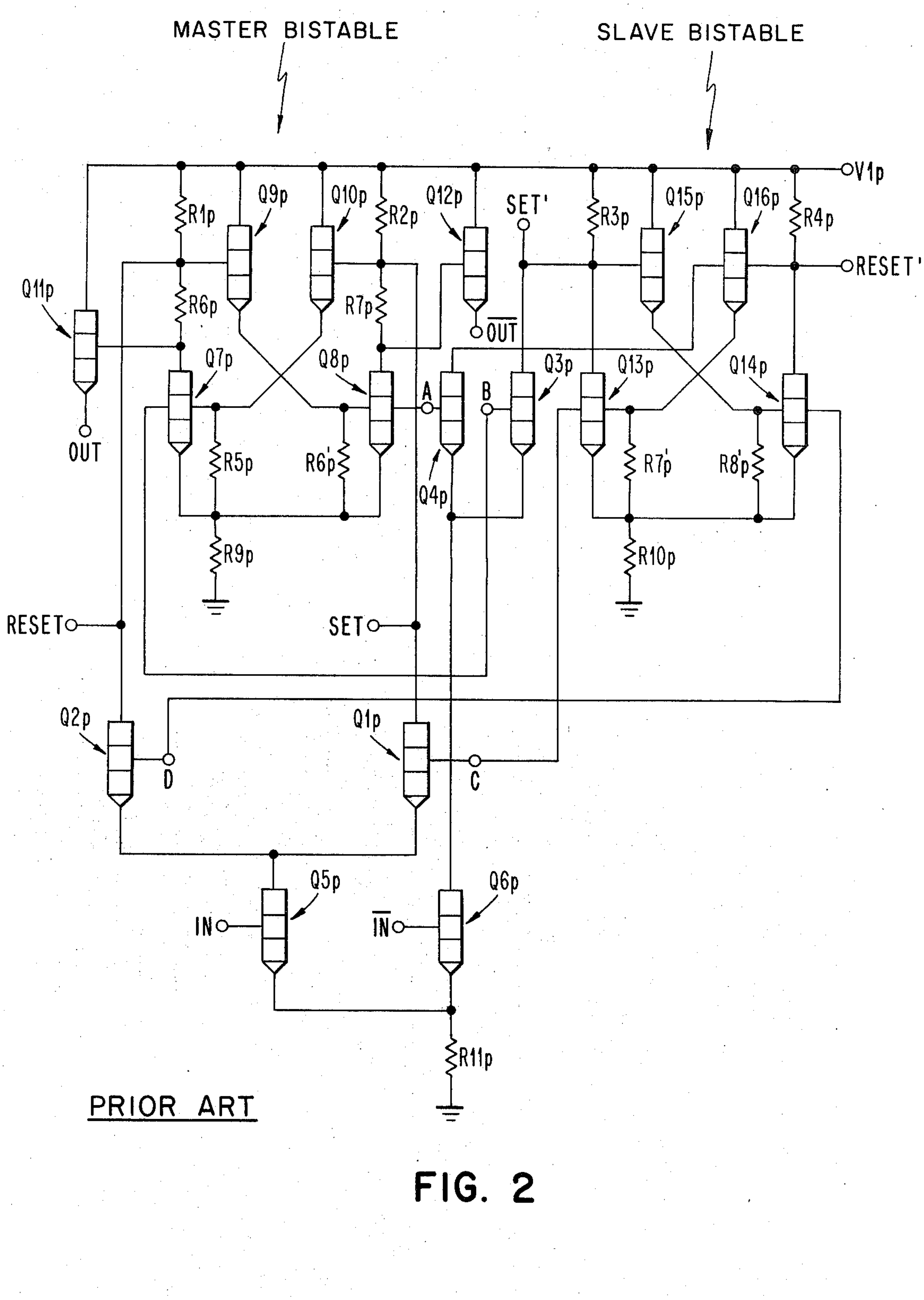
FIG. 2 is a circuit diagram showing the circuitry of a master-slave binary divider circuit in accordance with the prior art.

Referring now to FIG. 2, there is shown the circuit of a master-slave binary divider in accordance with the prior art. The six switching transistors Q1p to Q6p inclusive are given the same reference designations as in FIG. 1. The master bistable circuit comprises a pair of transistors Q7p, Q8p having collector load resistors R1p, R6p and R2p, R7p, respectively. The junction of resistors R1p, R6p is connected by emitter-follower transistor Q9p to the base of transistor Q8p, and the junction of resistors R2p, R7p is similarly connected through emitter-follower transistor Q10p to the base of transistor Q7p. This cross-coupling arrangement provides regenerative feedback in the conventional manner.

The bases of transistors Q7p, Q8p are connected through resistors R5p, R6p′ to the upper end of resistor R9p also connected to the emitters of transistors Q7p, Q8p. The lower end of resistor R9p is connected to ground. Emitter-follower transistors Q11p, Q12p transmit the output signal and its inverse from the collectors of transistors Q7p, Q8p. The collector of transistor Q1p is connected to the set input at the junction of resistors R2p, R7p and the collector of transistor Q2p is connected to the reset input at the junction of resistors R1p, R6p.

In FIG. 2 the slave bistable circuit comprises switching transistors Q13p, Q14p cross-coupled by emitter-follower transistors Q15p, Q16p. The collectors of transistors Q13p, Q14p are connected to load resistors R3p, R4p respectively. The lower end of resistor R10p is grounded and its upper end is connected to the emitters of transistors Q13p, Q14p and to the lower ends of resistors R7p′, R8p′ having their upper ends connected to the bases of transistors Q13p, Q14p. The collector of transistor Q3p is connected to the set input at the base of transistor Q15p, and the collector of transistor Q14p is connected to the reset input at the base of transistor Q16p. The respective inputs A, B, C, D at the bases of switching transistors Q4p, Q3p, Q1p, Q2p are connected to the corresponding output nodes of the master and slave bistable circuits in the same manner as shown in FIG. 1.

It is important to note that the master bistable circuit and the slave bistable circuit are connected in parallel between the positive power supply line V1p and the ground line. As a result, current flows from the positive power supply line V1 in two parallel paths provided by the two bistable circuits. Current also flows through the current switch comprising transistors Q5p, Q6p. Assuming a nominal current of 1 milliampere for each of the master and slave bistable circuits and the current switch Q5p, Q6p, the total current is 3 milliamperes. If the voltage of the positive power supply line V1 is 5 volts with respect to ground, the prior art binary divider shown in FIG. 2 will dissipate a total of 15 milliwatts. Although this power dissipation may be tolerable in some applications, there are many instances where it would be excessive so as to preclude the use of a master-slave binary divider. This problem is obviated by the novel master-slave binary divider circuit shown in FIG. 3 and described in detail below.

DESCRIPTION OF THE PREFERRED EMBODIMENT

Figure 3:
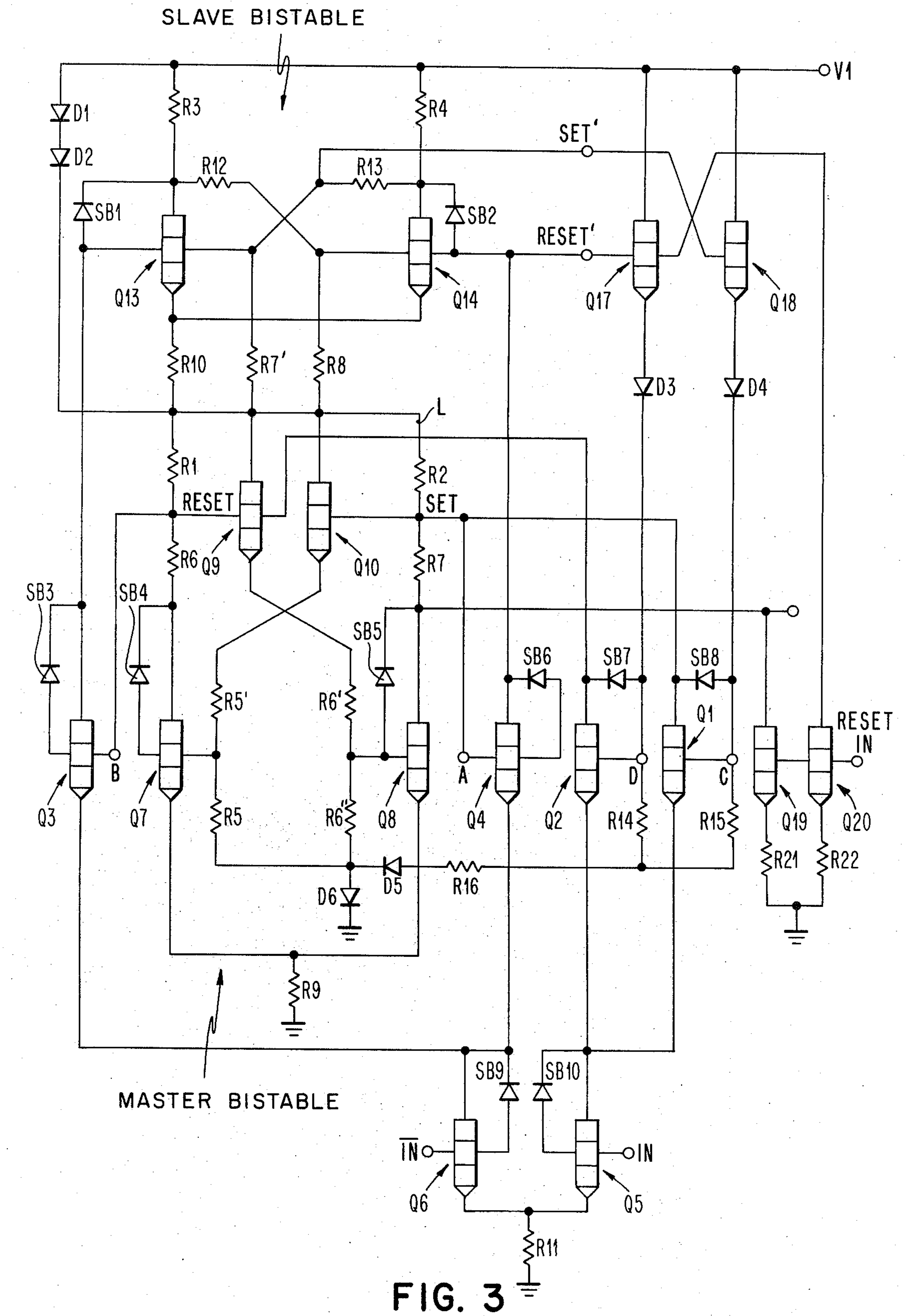
FIG. 3 is a circuit diagram showing a master-slave binary divider circuit in accordance with the present invention.

Referring now to FIG. 3, there is shown a preferred embodiment of the master-slave binary divider circuit in accordance with the present invention. Those components of FIG. 3 which correspond to components in the prior art circuit of FIG. 2 are given the same reference designations with the omission of the suffix "p."

STRUCTURE OF THE PREFERRED EMBODIMENT

The structure of the preferred embodiment of the invention will now be described with reference to FIG. 3. The master bistable circuit or flip-flop comprises a pair of switching transistors Q7, Q8 regeneratively cross-coupled by emitter-follower transistors Q9, Q10. The collector of transistor Q7 is provided with a series-connected pair of load resistors R1, R6 and the collector of transistor Q8 is similarly provided with a series-connected pair of load resistors R2, R7. The junction of resistors R1, R6 is connected to the base of transistor Q9 and the junction of resistors R2, R7 is connected to the base of transistor Q10. The emitter of transistor Q9 is connected to the base of transistor Q8 through a resistor R6′ and the emitter of transistor Q10 is connected to the base of transistor Q7 through a resistor R5′. The base of transistor Q7 is connected to the upper end of a resistor R5 having its lower end connected to the anode of a diode D6 having its cathode connected to ground. The base of transistor Q8 is connected to the upper end of a resistor R6″ having its lower end connected to the anode of diode D6. The emitters of transistors Q7, Q8 are connected to the upper end of a resistor R9 having its lower end connected to ground.

The lead L is in effect the upper voltage supply line of the master bistable circuit and the lower voltage supply line of the slave bistable circuit. The collectors of transistors Q9, Q10 of the master bistable circuit and the upper ends of load resistors R1, R2 are connected to lead L. The actual power supply line for the whole binary divider circuit is designated V1. A series-connected pair of diodes D1, D2 extend from power supply line V1 to lead L for a purpose to be described below.

The slave bistable circuit comprises a pair of switching transistors Q13, Q14 having load resistors R3, R4 extending from the respective collectors to power supply line V1. A cross-coupling resistor R12 extends from the collector of transistor Q13 to the base of transistor Q14, and another cross-coupling resistor R13 extends from the collector of transistor Q14 to the base of transistor Q13. A resistor R1′ extends from the base of transistor Q13 to lead L, and a resistor R8 extends from the base of transistor Q14 to lead L. The emitters of transistors Q13, Q14 are connected to the upper end of a resistor R10 having its lower end connected to lead L. A Schottky barrier diode SB1 is connected between the collector and base of transistor Q13 and another Schottky barrier diode SB2 is connected between the collector and base of transistor Q14.

Switch transistors Q1 to Q6 inclusive in FIG. 3 correspond to switch transistors Q1p to Q6p inclusive in FIGS. 1 and 2. The emitters of transistors Q5, Q6 are connected to the upper end of a resistor R11 having its lower end connected to ground. The IN signal is applied to the base of transistor Q5 and the $\overline{IN}$ is applied to the base of transistor Q6. The collector and base of transistor Q6 are connected by a Schottky barrier diode SB9, and the collector and base of transistor Q5 are connected by a Schottky barrier SB10.

The collector of transistor Q5 is connected to the emitters of transistors Q1, Q2. The collector of transistor Q6 is connected to the emitters of transistors Q3, Q4. The base of transistor Q1 is connected through a resistor R15 to one end of a resistor R16 having its other end connected to the anode of a diode D5. The base of transistor Q2 is similarly connected through a resistor R14 to one end of resistor R16. The collector and base of transistor Q1 are connected by a Schottky barrier diode SB8, and the collector and base of transistor Q2 are connected by a Schottky barrier diode SB7. The collector of transistor Q1 is connected to the SET input of the master bistable circuit at the base of transistor Q10.

A pair of transistors Q17, Q18 have their collectors connected to power supply line V1. The base of transistor Q17 is connected to the RESET′ input at the base of transistor Q14, and the base of transistor Q18 is connected to the SET′ input at the base of transistor Q13. The emitter of transistor Q17 is connected to the anode of a diode D3 having its cathode connected to input node D at the base of transistor Q2. The emitter of transistor Q18 is connected to the anode of a diode D4 having its cathode connected to input node C at the base of transistor Q1.

A pair of transistors Q19, Q20 have their emitters connected to ground through resistors R21, R22. The bases of transistors Q19, Q20 are connected to the RESET IN input. The collector of transistor Q19 is connected to the collector of transistor Q8 and the collector of transistor Q20 is connected to the base of transistor Q17.

OPERATION OF THE PREFERRED EMBODIMENT

1. Resetting Operation

Initially, the bases of transistors Q19 and Q20 are brought up by the RESET IN pulse so that both transistors Q19, Q20 conduct for a brief period. The collector current of transistor Q20 lowers the base voltage of transistor Q14 so that its collector current is reduced. This in turn decreases the voltage drop in collector load resistor R4 so that the base of transistor Q13 becomes more positive. The collector current of transistor Q13 increases, thereby increasing the voltage drop across its collector load resistor R3 and lowering the voltage at the base of transistor Q14. The action is thus regenerative and it ends with transistor Q14 off and transistor Q13 on, which is the reset state for the slave flip-flop.

The reset current pulse in the collector of transistor Q19 increases the voltage drop in the resistor R2 so that the base voltage of the emitter-follower transistor Q10 is lowered. This lowers its emitter output voltage which is fed to the base of transistor Q7 through resistors R5′ and R5. This reduces the collector current in transistor Q7 so that the voltage drop across its load resistor R1 is reduced. The voltage at the base of transistor Q9 therefore rises and the increased voltage is transmitted to the base of transistor Q8. Therefore, more current flows through the latter so that its collector voltage is reduced further. The action is thus again regenerative ending up with transistor Q7 off and transistor Q8 on, which is the normal set state for the master flip-flop.

The reset pulse is designed to be sufficiently strong so as to override the possible initial opposition of the current switch Q5, Q6 to the above-mentioned resetting operation. It is however noted that the current switch Q5, Q6 will also aid the resetting operation as soon as the master and slave flip-flops have reached the half way mark of regenerative switching. This will be seen from the following description of the action of the current switch Q5, Q6.

The resetting operation leaves the nodes A and D at a low voltage and the nodes B and C at a high voltage.

2. The Slave Flip-flop Circuit and Stabilizing Diodes

The slave flip-flop is designed to deliver a relatively small voltage output across the nodes SET and RESET, which, after d.c. level-shifting through the emitter followers Q17 and Q18 (as well as diodes D3 and D4) is used to provide a differential signal of at least 0.1 volt across the nodes C and D to steer the current of transistor Q5 to either transistor Q1 or transistor Q2.

Since the output voltage required from the slave is quite small, the total d.c. supply voltage required by it is also relatively small. This fact is exploited to good advantage in the present design by operating the slave with only about 1.5 volts supply (two diode drops) and reserving the balance of the supply voltage for the master flip-flop which has to be faster in most applications and is also required to supply at least about 1 volt differential output to the external circuit (about 10 times the output of the slave).

The flip-flop of the slave consists of transistors Q13 and Q14 whose emitters are tied together and connected to the common emitter resistor R10. The resistor R10 tends to stabilize the operation of the flip-flop by providing some degeneration (negative feedback) during switching. However, in view of the limited supply voltage available for the slave, the value of R10 is made quite small so that the voltage drop across it is limited to about 0.1 volt.

When transistor Q4 conducts, its collector current flows through resistors R3 and R12 causing considerable total voltage drop across them. The voltage at the base of transistor Q14 is thus reduced causing its collector current to drop. The drop in collector current reduces the voltage drop across load resistor R4 so that the voltage at the collector of transistor Q14 goes up, raising the voltage at the base of transistor Q13 through resistor R13.

Increase in the voltage at the base of transistor Q13 causes the collector current in Q13 to increase and its collector voltage to decrease. The reduced collector voltage of transistor Q13 lowers the base voltage of transistor Q14 still further through resistor R12. The action is thus regenerative, ending up in transistor Q13 being fully on and transistor Q14 fully off.

If the current were drawn through transistor Q3 (the node SET′) instead of transistor Q4, a similar reasoning leads to the conclusion that an inverse regenerative switching would set in, resulting in transistor Q13 turning off and transistor Q14 turning on.

During the initial time when current is drawn through transistor Q3 (or transistor Q4), lowering the voltage at the base of transistor Q13 (or transistor Q14), with transistor Q14 (or transistor Q13) already in the off state, transistor Q13 (or transistor Q14) ceases to draw current and its collector voltage starts rising slowly, depending upon the total stray capacitance associated with the terminals of resistors R3, R12 (or resistors R4, R13). Thus, both transistors Q13 and Q14 remain off during this period and the slave circuit draws very little current until the collector voltage rises sufficiently to turn on the base of the other transistor and initiate regenerative switching.

It is during this period of low current drain in the slave that the diodes D1 and D2 play a crucial role by maintaining a constant current supply in the master flip-flop. Also, since the voltage drop across the diodes is practically constant, they also help to stabilize the voltage of the line L during switching.

Similarly, when transistors Q19, Q20, Q1 or Q2 conduct to initiate switching in the master flip-flop, the diodes supply all the extra current, leaving the slave circuit practically unaffected by the switching of the master.

To sum up, the diodes stabilize the voltage of the common supply line L between the master and the slave, thereby practically eliminating all undesirable cross-coupling effects between them.

Since the total current in the master is always greater than the total current in the slave and the excess is supplied by the diodes, the diode current is always greater than zero, assuring that the stabilizing action is never lost.

Since the slave flip-flop does not have to be very fast (its switching action being required to be completed within half the period of the input signal), resistive cross-coupling through resistors R12, R13 is adequate for the design and is chosen for its simplicity.

Resistors R7′ and R8 are used to provide d.c. level shifting of the collector outputs to bring them down to levels suitable for the bases of transistors Q13, Q14. Their actual values are dictated by the permissible power dissipation and circuit delay.

3. The Master Flip-Flop

The master bistable flip-flop comprises the cross-coupled transistors Q7 and Q8 whose emitters are tied to a common resistor R9.

Load resistors R1, R6 and R2, R7 are tapped at approximately the midpoints of the total series resistance to feed the bases of transistors Q9 and Q10. Tapping of the load resistors reduces the differential voltage appearing across the bases of transistors Q7, Q8 through emitter-follower transistors Q9, Q10 and resistors R5′, R6′. The resistors R5′, R5 and resistors R6′, R6″ attenuate the outputs of the emitter-follower transistors Q9, Q10 still further and also provide d.c. level shifting to make the voltages suitable for applying to the bases of transistors Q7, Q8. In fact, by proper choice of the tapping points, the voltage levels at the bases of transistors Q7, Q8 can be made equal to the levels at the bases of transistors Q5, Q6 so that the input of the next identical binary divider can be directly coupled to the bases of transistors Q7, Q8, thereby eliminating the need for additional buffer circuits and/or level shifters between successive cascaded binary dividers. This helps to reduce overall power dissipation of the chain and also to reduce the overall signal delay.

Diode D6 provides a fairly constant, slightly positive node to which resistor R5 and resistor R6″ can be returned. This helps to reduce their resistor values, thereby increasing the switching speed. The anode of diode D5 along with resistor R16 plays a similar role by providing a positive node for the resistors R14 and R15.

When the voltage at the base of transistor Q10 is lowered (either by turning on transistor Q1 or transistor Q19), it reduces the voltage at the base of transistor Q7 (through transistor Q10 and resistor R5′). The voltage at the collector of transistor Q7 therefore rises, lifting up the voltages at the bases of transistor Q9 and transistor Q8 (through resistor R6′). Transistor Q8 then draws more current, thereby lowering its collector voltage still further. Regenerative switching is thus initiated, ending up with transistor Q8 on and transistor Q7 off. A similar but reverse process occurs if transistor Q2 is made to draw current instead of transistors Q1, Q9 and it ends up with transistor Q7 on and transistor Q8 off.

The set or reset state of the master flip-flop is communicated to the slave flip-flop through transistors Q3, Q4 which are coupled to the bases of transistor Q9 and transistor Q10 respectively. Transistors Q3, Q4 act as buffers and prevent loading of the master flip-flop by the set/reset current requirement of the slave flip-flop.

4. Operation of the Current Switch Transistors Q5, Q6

Assume that the resetting pulse is off so that transistor Q19 and transistor Q20 are nonconducting, and that input IN is up so that transistor Q5 conducts. Its collector current passes through transistor Q1 because node C is high and node D is low. This again lowers the base of transistor Q10 and reinforces the set state of the master flip-flop. However, since the same purpose has already been achieved by using the RESET IN pulse, no further switching of states occurs at this time.

Next, let input IN go down and input $\overline{IN}$ come up so that transistor Q6 conducts and its collector current passes through transistor Q3 because node B is high and node A is low. The current through transistor Q3 pulls the base of transistor Q13 down so that its collector current is reduced. Its collector voltage therefore rises and so does the base voltage of transistor Q14 through resistor R12.

The feedback from the collector of transistor Q14 to the base of transistor Q13 through resistor R13 causes regenerative switching of the slave flip-flop from the reset to the set state so that finally node D goes up and node C comes down.

When input $\overline{IN}$ goes down again and input IN goes up, the current of transistor Q5 flows through transistor Q2 instead of transistor Q1. The base of transistor Q9 is pulled down because of the increased voltage drop across resistor R1 as a result of the current of transistor Q2 flowing through it. Regenerative switching of the master is thus initiated, ending in its reset state so that node B goes down and node A goes up.

Next time that input $\overline{IN}$ goes up (and input IN goes down), the current of transistor Q6 flows through transistor Q4 instead of transistor Q3, causing the slave to reset. The cycle is thus completed.

It will be understood that the specific embodiments shown in the drawings and described above are merely illustrative of several of the many forms which the invention may take in practice and that numerous modifications and variations of these embodiments will readily occur to those skilled in the art without departing from the scope of the invention which is delineated in the appended claims, and that the claims are to be construed as broadly as permitted by the prior art.

I claim:

1. In a binary divider circuit including a master bistable circuit, a slave bistable circuit, and means interconnecting said bistable circuits for changing the state of each circuit in accordance with the state of the other circuit, the improvement comprising:

a voltage supply having a first supply line at a first potential and a second supply line at a second potential displaced from said first potential;

means connecting said slave bistalbe circuit to said first supply line;

means connecting said master bistable circuit to said second supply line;

means connecting said slave bistable circuit to said master bistable circuit whereby said master and slave bistable circuits extend in series between said first and second supply line with current flowing from one of said supply lines to one of said bistable circuits and then through the other bistable circuits into the other said supply lines; and conductive means extending from said first supply line to said master bistable circuit for bypassing current from said first supply line around said slave bistable circuit than to said master bistable circuit whereby the latter may provide a higher output power and/or faster switching speed and said slave bistable circuit.

2. A binary divider circuit as recited in claim 1 wherein said conductive means comprises at least one diode.

3. In a binary divider circuit including a master bistable circuit, a slave bistable circuit, and means interconnecting said bistable circuits for changing the state of each circuit in accordance with the state of the other circuit, the improvement comprising:

A voltage supply having a first supply line at a first potential and a second supply line at a second potential displaced from said first potential;

means connecting said slave bistable circuit to said first supply line;

means connecting said master bistable circuit to said second supply line;

means connecting said slave bistable circuit to said master bistable circuit whereby said master and slave bistable circuits extend in series between said first and second supply lines with current flowing from one of said supply lines through one of said bistable circuits and then through the other bistable circuits into the other said supply lines; and voltage regulating means for maintaining the voltage across one of said bistable circuits approximately constant to prevent each bistable circuit from interacting with the other bistable circuit as their respective impedances vary during their respective switching operations.

4. A binary divider circuit as recited in claim 3 wherein said voltage regulating means comprises at least one diode.

5. In a binary divider circuit including a master bistable circuit, a slave bistable circuit and means interconnecting said bistable circuits for changing the state of each circuit in accordance with the state of the other circuit, the improvement comprising:

A voltage supply having a first supply line at a first potential and a second supply line at a second potential displaced from said first potential;

means connecting a slave bistable circuit to said first supply line;

means connecting said master bistable circuit to said second supply line;

means connecting said slave bistable circuit to said master bistable circuit whereby said master and slave bistable circuits extend in series between said first and second supply line with current flowing from one of said supply lines to one of said bistable circuits and then through the other bistable circuits into the other said supply lines; and conductive means extending from said first supply line to said master bistable circuit for bypassing current from said first supply line around said slave bistable circuit and to said master bistable circuit whereby the latter may provide a higher output power and/or faster switching speed than said slave bistable circuit;

and voltage regulating means for maintaining the voltage across one of said bistable circuits approximately constant to prevent each bistable circuit from interacting with the other bistable circuit as their respective impendances vary during their respective switching operations.

6. A binary divider circuit as recited in claim 5 wherein said conductive means and said voltage regulating means together comprise at least one diode, means connecting one end of said diode to said first supply line, and means connecting the other end of said diode to said master bistable circuit.

7. In a binary divider circuit including a master bistable circuit having a first output, a second output, a first set input and a first reset input, a slave bistable circuit having a third output, a fourth output, a second set input and a second reset input, a first switch having a fifth output connected to said first set input and a sixth output connected to said first reset input, and having a first input connected to said third output and a second input connected to said fourth output, a second switch having a seventh output connected to said second set input and an eighth output connected to said second reset input, and having a third input connected to said second output and a fourth input connected to said first output, and a third switch having a ninth output connected to said first switch and a tenth output connected to said second switch, the improvement comprising:

a voltage supply having a first supply line at a first potential and a second supply line at a second potential displaced from said first potential, means connecting said slave bistable circuit to said first supply line, means connecting said master bistable circuit to said second supply line, and means connecting said slave bistable circuit to said master bistable circuit whereby said master and slave bistable circuits extend in series between said first and second supply lines with current flowing from one of said supply lines through one of said bistable circuits and then through the other of said bistable circuits into the other of said supply lines.

8. A binary divider circuit as recited in claim 7 and comprising conductive means extending from said first supply line to said master bistable circuit for bypassing current from said first supply line around said slave bistable circuit and to said master bistable circuit whereby the latter may provide a higher output power and/or faster switching speed than said slave bistable circuit.

9. A binary divider circuit as recited in claim 8 wherein said conductive means conprises at least one diode.

10. A binary divider circuit as recited in claim 7 and comprising voltage regulating means for maintaining the voltage across one of said bistable circuits approximately constant to prevent each bistable circuit from interacting with the other bistable circuit as their respective impedances vary during their respective switching operations.

11. A binary divider circuit as recited in claim 10 wherein said voltage regulating means comprises at least one diode.

12. A binary divider circuit as recited in claim 7 and comprising conductive means extending from said first supply line to said master bistable circuit for bypassing current from said first supply line around said slave bistable circuit and to said master bistable circuit whereby the latter may provide a higher output power and/or faster switching speed than said slave bistable circuit, and voltage regulating means for maintaining the voltage across one of said bistable circuits approximately constant to prevent each bistable circuit from interacting with the other bistable circuit as their respective impedances vary during their respective switching operations.

13. A binary divider circuit as recited in claim 12 wherein said conductive means and said voltage regulating means together comprise at least one diode, means connecting one end of said diode to said first supply line, and means connecting the other end of said diode to said master bistable circuit.

* * * * *

PO-1050
(5/69)

UNITED STATES PATENT OFFICE
CERTIFICATE OF CORRECTION

Patent No. 3,814,953 Dated June 4, 1974

Inventor(s) Shashi D. Malaviya

It is certified that error appears in the above-identified patent and that said Letters Patent are hereby corrected as shown below:

Column 2, Line 1 (In the Application, Page 3, Line 23) change "ahieved" to -- achieved --

Column 4, Line 54 (In the Application, Page 10, Line 2) change "R1'" to -- R7' --

Column 6, Line 19 (In the Application, Page 13, Line 5) change "SET" and "RESET" to -- SET' and RESET' --

Column 9, Line 13 change "bistalbe" to -- bistable --

Column 11, Line 16 change "conprises" to -- comprises --

Signed and sealed this 3rd day of December 1974.

(SEAL)
Attest:

McCOY M. GIBSON JR.
Attesting Officer

C. MARSHALL DANN
Commissioner of Patents